July 22, 1969

J. W. DUGAN 3,456,977

PICKUP TRUCK STOCK RACK

Filed May 5, 1967

Joseph Wayne Dugan
INVENTOR.

BY *Clarence A. O'Brien*
and *Harvey B. Jacobson*
Attorneys

July 22, 1969 J. W. DUGAN 3,456,977
PICKUP TRUCK STOCK RACK
Filed May 5, 1967 3 Sheets-Sheet 2

Joseph Wayne Dugan
INVENTOR.

BY *Clarence A. O'Brien*
and *Harvey B. Jacobson*
Attorneys

July 22, 1969  J. W. DUGAN  3,456,977
PICKUP TRUCK STOCK RACK
Filed May 5, 1967  3 Sheets-Sheet 3
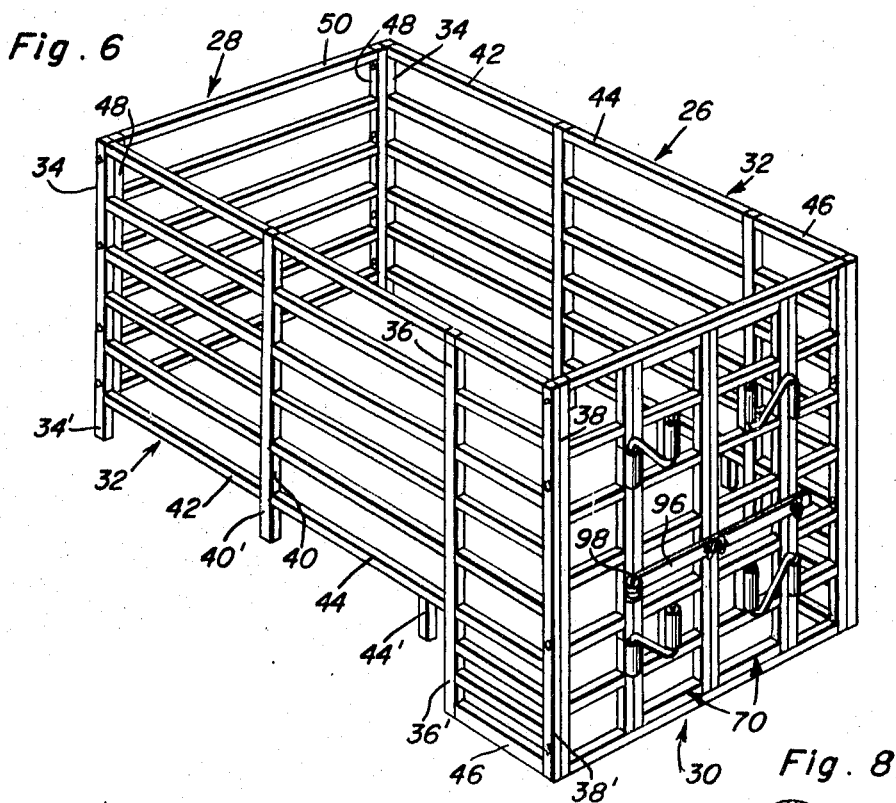
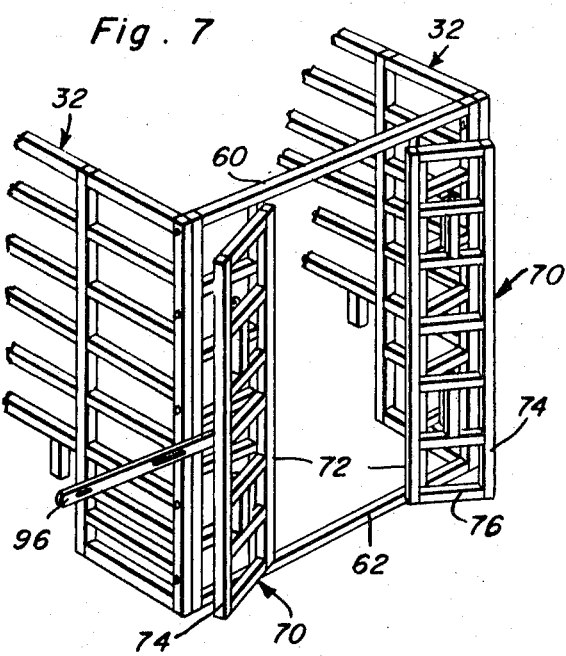
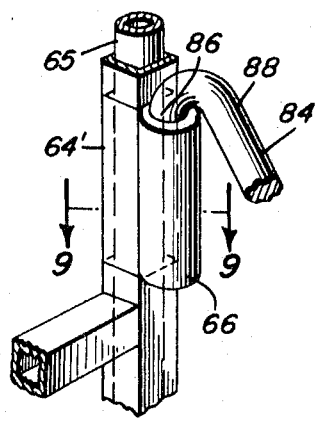
Joseph Wayne Dugan
INVENTOR.

United States Patent Office 3,456,977
Patented July 22, 1969

3,456,977
PICKUP TRUCK STOCK RACK
Joseph Wayne Dugan, Box 374, Chetopa, Kans. 67336
Filed May 5, 1967, Ser. No. 636,394
Int. Cl. B60p 3/04, 3/42; B62d 33/00
U.S. Cl. 296—10                                          8 Claims

ABSTRACT OF THE DISCLOSURE

A stock rack for removable securement to and adapted to form an extension of a pickup truck load body, the rack including front, rear and opposite side wall portions and double-horizontally swingable gate portions in its rear wall removably closing an opening formed in the rear wall.

The pickup truck stock rack of the instant invention has been designed to provide a means whereby farm stock such as cows or cattle may be readily loaded onto or unloaded from a pickup truck. Although it is not very difficult to urge a cow out of a pickup truck load body, cows have a tendency to back out of a pickup truck load bed equipped with side extensions prior to being fully positioned or loaded onto a pickup truck load body and a single person loading a cow onto a pickup truck load body equipped with side extensions quite often finds it difficult to close the rear gate of the stock rack equipped pickup truck before the cow backs out of the opening normally closed by the rear gate.

It is accordingly the main object of this invention to provide a pickup truck stock rack which may be readily supported from conventional pickup truck load beds and including a rear gate structure constructed in a manner which will enable a single person to begin to close the rear opening in the stock rack before the cow being loaded has completely entered the stock rack and to also utilize the rear opening closing gate structure as a means to push the cow being loaded fully into the stock rack should the cow have any tendency to back out of the rack.

Another object of this invention, in accordance with the immediately preceding object, is to provide a stock rack which may be readily removably secured to existing pickup truck load bed constructions.

Another object of this invention is to provide a pickup truck stock rack including side and end wall portions thereof which may be readily disassembled for compact storage and/or shipment.

A still further object of this invention is to provide a stock rack for a pickup truck that will form a rearward extension of a conventional pickup truck load bed.

A final object of this invention to be specifically enumerated herein is to provide a pickup truck stock rack construction which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a perspective view of the stock rack;

FIGURE 7 is a fragmentary perspective view of the rear portion of the stock rack and with the gate members thereof in open positions;

FIGURE 8 is a fragmentary enlarged perspective view of a portion of the rear wall assembly illustrating the manner in which the hinge members for the gate members are pivotally supported from the rear wall assembly.

Figure 1:
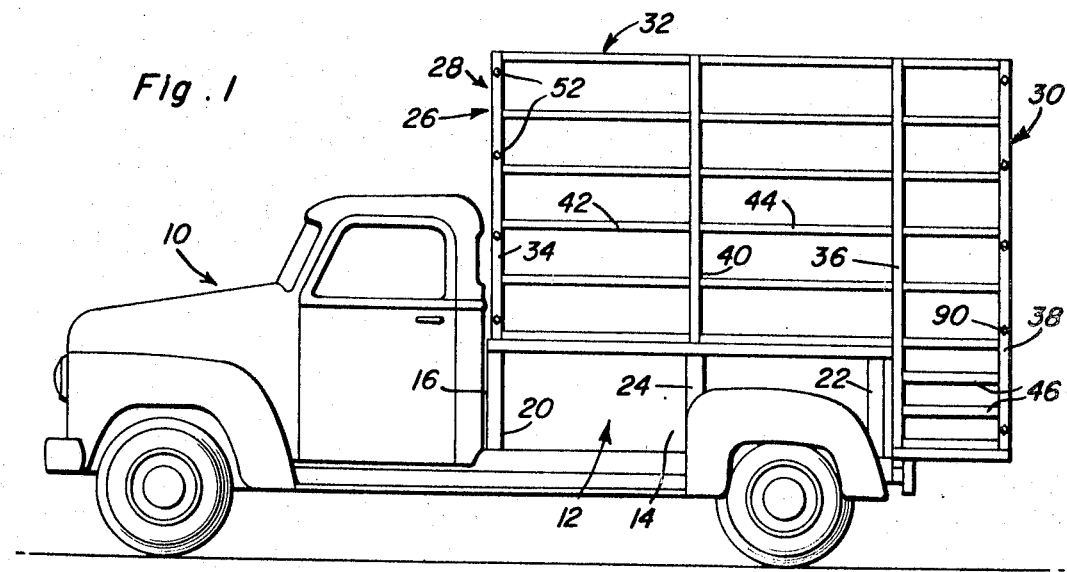
FIGURE 1 is a side elevational view of a conventional form of pickup truck with the stock rack of the instant invention operatively associated therewith.

Referring now more specifically to the drawings the numeral 10 generally designates a conventional form of pickup truck including a load bed construction referred to in general by the reference numeral 12. The load bed construction 12 includes a pair of upstanding opposite side walls 14, a front wall 16, and a vertically swingable tailgate 18 pivotally secured between the rear ends of the side walls 14 for movement between an upstanding position extending between the rear edge portions of the side walls 14 and a horizontally disposed position forming an extension of the flooring (not shown) of the load bed construction 12. Of course, as will be hereinafter more fully appreciated, the tailgate 18 is positioned in the horizontally disposed position whenever the stock rack of the instant invention is used.

The load bed construction 12 includes front and rear tubular corner post members 20 and 22 and each of these corner posts opens upwardly through the upper marginal edge portion of the corresponding side wall 14. In addition, each of the side walls 14 includes an intermediate post 24 of similar construction which also opens upwardly through the upper marginal edge portion of the corresponding side wall 14.

Figure 4:
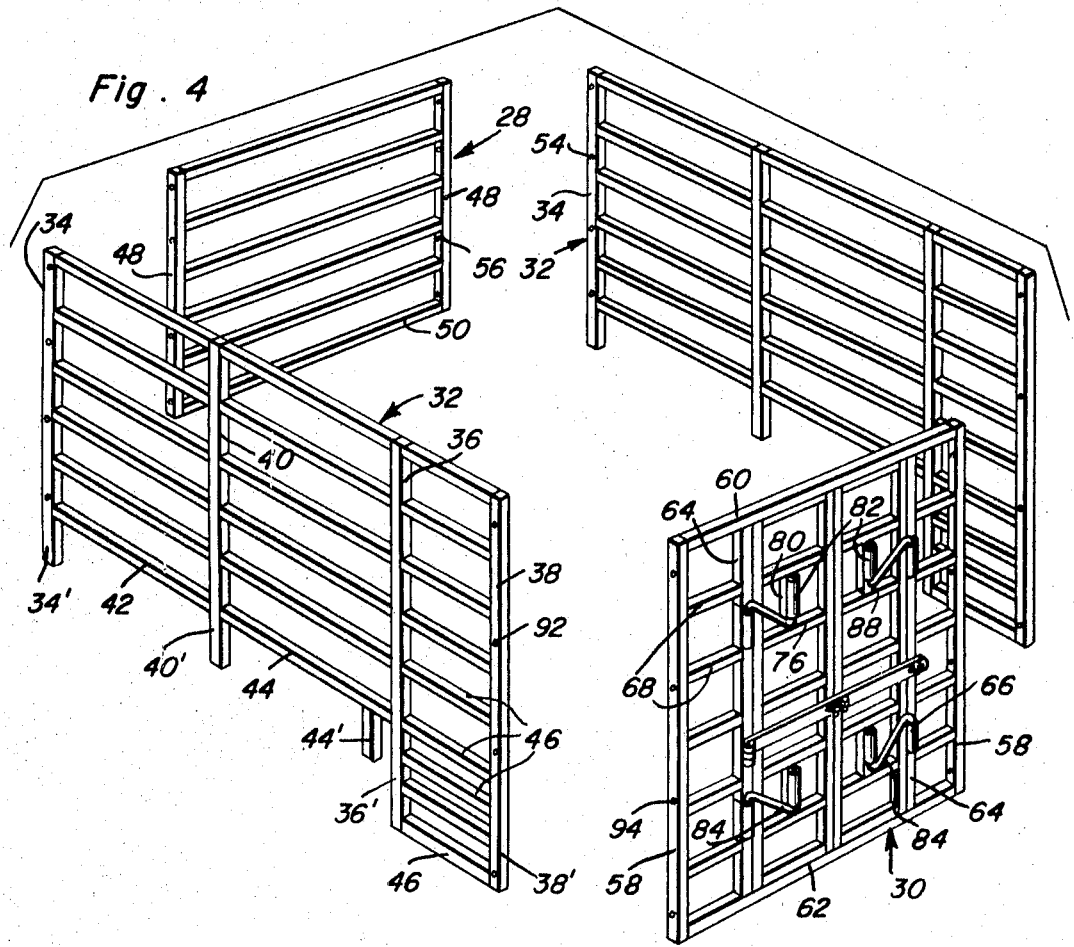
FIGURE 4 is an exploded perspective view of the stock rack.
Figure 5:
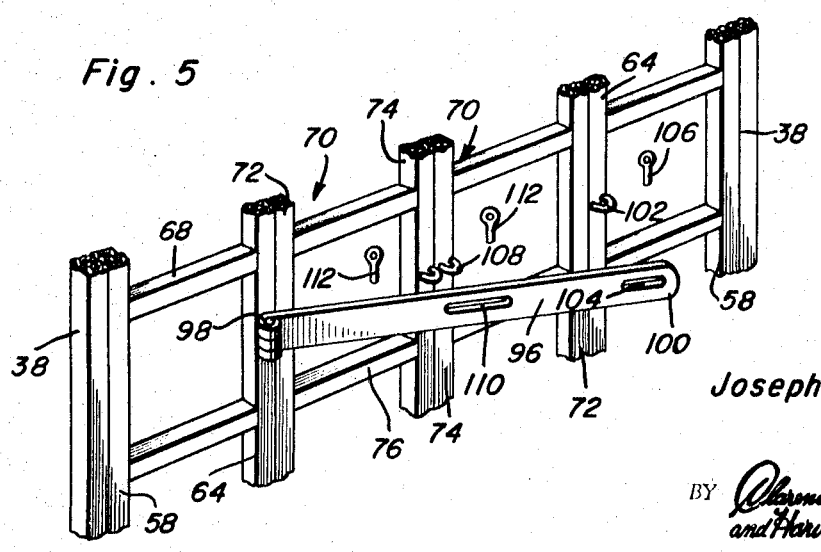
FIGURE 5 is a fragmentary perspective view of the rear portion of the stock rack illustrating the manner in which the two gate members thereof may be readily removably secured in the closed positions.

The pickup truck stock rack of the instant invention is generally referred to by the reference numeral 26 and includes, with attention now directed more specifically to FIGURE 4 of the drawings, front and rear wall assemblies generally referred to by the reference numerals 28 and 30 and substantially identical opposite side wall assemblies generally referred to by the reference numerals 32.

The side wall assemblies 32 each include a front upstanding post 34, a pair of longitudinally spaced rear upstanding posts 36 and 38 and an intermediate upstanding post 40. A plurality of longitudinally extending, horizontally disposed and vertically spaced elongated members 42 are secured between the posts 34 and 40 and a further set of similar elongated members 44 are secured between the posts 36 and 40 while a third set of vertically spaced, elongated and horizontally disposed members 46 are secured between the rear posts 36 and 38. The rear posts 36 and 38 include lower end extensions 36′ and 38′ between which the three lowermost members 46 are secured and which, together with the latter, form rearward continuations of the side walls 14. In addition, the posts 34 and 40 include short downward extensions 34′ and 40′ and a short depending post 44′ is carried by the rear end of each lowermost horizontal member 44. The extensions 34′ and 40′ and the post 44′ of each side wall assembly 32 are telescoped downwardly into the upper ends of the corresponding posts 20, 24 and 22 so as to removably support the side wall assemblies 32 from the load bed construction or assembly 12. The front end wall 28 includes a pair of opposite side posts 48 between which a plurality of horizontally disposed, vertically spaced and elongated members 50 are secured in any convenient manner. The front wall assembly 28 is secured between the forward ends of the side wall assemblies 32 by means of suitable fasteners 52 secured through bores 54 and 56 formed in the posts 34 and 48, respectively.

The rear wall assembly 30 includes a pair of opposite side posts 58 between whose upper and lower ends upper and lower horizontal members 60 and 62, respectively, are secured in any convenient manner. In addition, the rear wall assembly 30 includes additional upstanding posts 64 secured between the members 60 and 62 and which each includes a pair of vertically spaced rotatable sections 64' journaled on pipe or shaft sections 65 secured in and bridging the spacing between adjacent end portions of the stationary portions of the posts 64 between which the rotatable sections 64' are received. Each of the rotatable sections 64' has an upstanding sleeve 66 secured to its rear outer surface and a plurality of horizontally disposed, vertically spaced and elongated members 68 are secured between each pair of adjacent posts 58 and 64.

A pair of upstanding gate members 70 are disposed between the posts 64 and each gate member 70 includes a pair of upstanding posts 72 and 74 between which a plurality of elongated, horizontally disposed and vertically spaced members 76 are secured. The gate members 70 are receivable between the upper and lower members 60 and 62 and each gate member 70 includes a pair of vertical supports 80 secured between adjacent members 76 to whose outer surfaces a pair of vertically aligned sleeves 82 similar to sleeves 66 are secured.

A pluraltiy of generally Z-shaped hinge members or swing arms 84 including parallel oppositely facing leg portions 86 interconnected by a diagonal portion 88 are provided and positioned with the leg portions 86 disposed vertically. The hinge members 84 supporting each gate member 70 have their upwardly projecting leg portions 86 rotatably received in the corresponding sleeves 82 and their downwardly projecting leg portions 86 rotatably received in the corresponding sleeves 66. In this manner, each of the gate members 70 is swingable relative to the corresponding sleeves 60 while being maintained stationary relative to the associated hinge members 84 and is also swingable relative to the corresponding hinge members 84 independent of swinging movement of those hinge members 84 relative to the corresponding sleeves 66. Accordingly, it may be seen that the gate members 70 may be swung toward various open positions relative to the opening closable thereby formed between the posts 64. Also, the gate members 70 may be swung toward and away from various open positions relative to the opening closable thereby with the gate members 70 disposed inwardly of the rear wall assembly 30 due to the rotatable mounting of the sections 64'. In this manner, the pickup truck 10 may be backed up to an unloading chute or dock in abutting relation therewith and the gate members 70 may be opened inwardly of the rear wall assembly 30 so as to eliminate the chance that livestock might jump out of the stock rack 26 as might be the case if the gate members 70 could be opened only to the outside of the rear wall assembly 30 and first had to be opened before backing the pickup truck 10 into full engagement with the unloading chute or dock. Of course, inasmuch as the tailgate 18 of the pickup truck 10 does not project beyond the rear wall assembly 30 when the tailgate 18 is in its horizontally disposed open position, the recessed mounting of the tailgate 18 and the pivotal mounting of the sections 64' coact to enable the fully closed stock rack 26 to have its rear wall assembly 30 abutted against an unloading chute or dock prior to the rear end of the stock rack 26 being opened.

The rear wall assembly 30 is secured between the posts 38 in any convenient manner such as by fasteners 90 secured through bores 92 and 94 formed in adjacent posts 38 and 58. Further, it will be noted that when the tailgate 18 is in the horizontally disposed position it forms an extension of the flooring of the load bed assembly 12 which extends between the rear end of the load bed assembly 12, the lower member 62 and also between the lowermost members 46 carried by the side wall assemblies 32.

Figure 2:
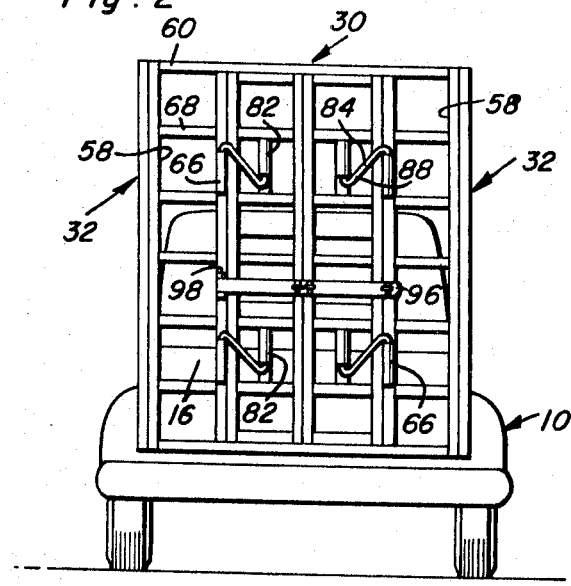
FIGURE 2 is a rear end elevational view of the assemblage illustrated in FIGURE 1.
Figure 9:
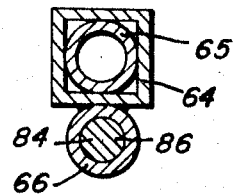
FIGURE 9 is a horizontal sectional view taken substantially upon the plane indicated by the section line 9—9 of FIGURE 8.

A latching strap 96 is pivotally secured at one end to one of the posts 64 by means of a hinge construction 98 and is swingable to a position with its free end 100 overlying the rear surface of the other post 64. This portion of the rear surface of the other post 64 includes an outwardly projecting eye member 102 which is receivable through a slot 104 provided therefor in the latching strap 96 and a locking pin 106 is receivable through the eye portion or member 102 so as to retain the latching strap 96 in the closed position thereof illustrated in FIGURES 2, 4 and 6 of the drawings. In addition, each of the posts 74 includes an eye portion 108 which is receivable through a corresponding slot 110 formed in the latching strap 96 centrally intermediate its opposite ends and a pair of locking pins 112 are provided for insertion through the eye portions 108 after the latter have been inserted through the slots 110. In this manner, the gate members 70 may be locked in their closed positions illustrated in FIGURES 2, 4 and 6 of the drawings.

Of course, after the stock rack 26 has been assemblied in the manner illustrated in FIGURE 6 of the drawings, the entire stock rack 26 may be handled as an integral unit and removably mounted upon the load bed 12 of the pickup truck 10 by lowering the stock rack 26 downwardly over the load bed 12 in a manner such that the extensions 34' and 40' as well as the posts 44' will be downwardly telescopingly received in the open upper ends of the tubular posts 20, 24 and 22, respectively.

Figure 3:
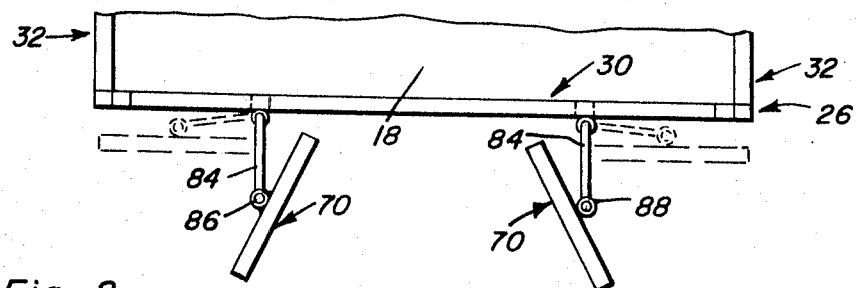
FIGURE 3 is a fragmentary enlarged top plan view of the rear portion of the stock rack with the horizontally swingable gate members thereof illustrated in a first partially open position in solid lines and in second fully open positions in phantom lines.

In operation, the gate members 70 may be positioned in a manner similar to the positions thereof illustrated in FIGURES 3 and 7 of the drawings to form a structure for "funneling" cattle into the stock rack 26. Then, as the rear haunches of a cow pass between the gate members 70, the latter may be swung toward each other in a manner closing in from opposite side portions of the rear of a cow being loaded in a manner to push the cow into the stock rack 26. Of course, as soon as the gate members 70 have been closed, the pin 106 may be dropped into position and thereafter the pins 112 may be dropped into position so as to lock the gate members 70 against being opened by a cow attempting to back out of the stock rack 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A stock rack for a pickup truck of the type including a load bed provided with a floor, upstanding front and opposite side walls and a rear tailgate swingable between an upstanding position extending between the rear ends of said side walls and a horizontally disposed position projecting rearwardly of said side walls and forming a rearward extension of said floor, said stock rack including upstanding extension side wall sections and a rear wall section extending between the rear ends of said side wall sections and including means adapted to support said stock rack from said load bed with said side wall sections forming upward extensions of the upper marginal portions of said side walls, said rear wall having an entrance and exit opening formed therein, a pair of upstanding panel-like gate members, generally horizontally extending swing arm means provided for each of said gate members, one set of corresponding ends of said swing arm means being pivotally secured to the corresponding gate members generally centrally intermediate their opposite upstanding edge portions for rotation about upright axes extending transversely of said arm means and the other set of ends of said arm means being pivotally secured to the portions of said rear wall section defining the corresponding sides of said opening for rotation about upstanding axes extending transversely of said arm means.

2. In combination with a pickup truck of the type including a load bed provided with a floor, upstanding front and opposite side walls and a rear tailgate swingable between an upstanding position extending between the rear ends of said side walls and a horizontally disposed position projecting rearwardly of said side walls and forming a rearward extension of said floor, a stock rack including upstanding extension side wall sections and a rear wall section extending between the rear ends of said side wall sections, said stock rack being removably supported from said load bed with said side wall sections forming upward extensions of the upper marginal portions of said side walls said rear wall section having an entrance and exit opening formed therein and being provided with closure means for said entrance and exit opening movable into and out of position closing said opening, said closure means comprising a pair of upstanding panel-like gate members, generally horizontally extending pivot arm means provided for each of said gate members, one set of corresponding ends of said pivot arm means being pivotally secured to the corresponding gate members generally centrally intermediate their opposite upstanding edge portions for rotation about upright axes extending transversely of said arm means and the other set of ends of said arm means being pivotally supported to the portions of said rear wall section defining the corresponding sides of said opening for rotation about upright axes extending transversely of said arm means.

3. The combination of claim 2 wherein said side wall sections are generally grill-like in configuration.

4. In combination with a pickup truck of the type including a load bed provided with a floor, upstanding front and opposite side walls and a rear tailgate swingable between an upstanding position extending between the rear ends of said side walls and a horizontally disposed position projecting rearwardly of said side walls and forming a rearward extension of said floor, a stock rack including upstanding extension side wall sections and a rear wall section extending between the rear ends of said side wall sections, said stock rack being removably supported from said load bed with said side wall sections forming upward extensions of the upper marginal portions of said side walls and also rearward extensions of the rear marginal portions of said side walls extending along and projecting above the opposite side edge portions of said tailgate when the latter is in its horizontally disposed position and said rear wall projecting upwardly from the rear marginal edge portion of said tailgate, the rear end portions of said side walls sections extending rearward beyond and forming rearward extensions of said side walls and projecting downwardly below the lower marginal portions of the portions of said side wall sections disposed forwardly thereof a distance generally equal the vertical extent said side walls project above said floor and are of a longitudinal extent generally equal the rearward extent of said tailgate rearwardly of said side walls when said tailgate is horizontally disposed.

5. In combination with a pickup truck of the type including a load bed provided with a floor, upstanding front and opposite side walls and a rear tailgate swingable between an upstanding position extending between the rear ends of said side walls and a horizontally disposed position projecting rearwardly of said side walls and forming a rearward extension of said floor, a stock rack including upstanding extension side wall sections and a rear wall section extending between the rear ends of said side wall sections, said stock rack being removably supported from said load bed with said side wall sections forming upward extensions of the upper marginal portions of said side walls and also rearward extensions of the rear marginal portions of said side walls extending along and projecting above the opposite side edge portions of said tailgate when the latter is in its horizontally disposed position and said rear wall projecting upwardly from the rear marginal edge portion of said tailgate, said side walls including means defining longitudinally spaced upwardly opening sockets, said side wall sections, forward of the rear end portions thereof defining rearward extensions of said side walls, including depending members downwardly telescoping receivable in said sockets.

6. The combination of claim 1 wherein said gate members and said portions of said rear wall section defining the corresponding sides of said openings have upstanding rearwardly projecting sleeve members secured thereto, said one set of ends of said arm means including upstanding shank portions rotatably received in the sleeve members carried by said gate members and the other set of ends of said arm means include upstanding shank portions rotatably received in the sleeve members carried by said portions of said rear wall section.

7. The combination of claim 6 wherein the shank portions of said one set of ends of said arm means project upwardly and the shank portions on the other set of ends of said arm means project downwardly.

8. The combination of claim 6 wherein said sleeve members are supported from the portions of said rear wall section defining the corresponding sides of said opening by means supporting said sleeve members for swinging movement in a generally horizontal plane between the last mentioned portions through the plane of said opening.

References Cited

UNITED STATES PATENTS

| 3,365,230 | 1/1968 | Langdon | 296—43 X |
| 2,751,248 | 6/1956 | Kritser | 296—43 |
| 2,808,291 | 10/1957 | Van Meter | 296—12 X |
| 2,801,130 | 7/1957 | Booker | 296—12 |

PHILIP GOODMAN, Primary Examiner

U.S. Cl. X.R.

296—12, 51